United States Patent [19]

Longhi

[11] 4,189,291
[45] Feb. 19, 1980

[54] APPARATUS AND PROCESS FOR RECOVERING SCRAPS OF THERMOPLASTIC MATERIAL, EVEN OF HETEROGENEOUS SHAPES, BY GRADUAL MELTING AND COMPRESSION THROUGH ONE OR MORE ORIFICES

[76] Inventor: Eligio Longhi, Via Don Minzoni, 2-San Lazzaro di Savena (Bologna), Italy

[21] Appl. No.: 923,326

[22] Filed: Jul. 10, 1978

[30] Foreign Application Priority Data

Jul. 18, 1977 [IT] Italy .............................. 25808 A/77

[51] Int. Cl.² ........................................... B29H 19/00
[52] U.S. Cl. .................................... 425/215; 425/225; 425/363; 425/374; 425/378 R; 264/37; 264/80; 264/320
[58] Field of Search ............... 425/215, 225, 363, 365, 425/374, 378; 264/37, 80, 320

[56] References Cited

U.S. PATENT DOCUMENTS

| | | | |
|---|---|---|---|
| 2,183,196 | 12/1939 | Kohler | 425/374 |
| 2,249,507 | 7/1941 | Van Derhoet | 425/225 |
| 2,892,212 | 6/1959 | Rhodes | 425/374 |
| 3,607,999 | 9/1971 | Corbett et al. | 264/37 |
| 3,824,298 | 7/1974 | Sherer | 264/37 |
| 4,009,235 | 2/1977 | Bober | 264/37 |

*Primary Examiner*—William E. Schulz
*Attorney, Agent, or Firm*—Robert E. Burns; Emmanuel J. Lobato; Bruce L. Adams

[57] ABSTRACT

Device for recovering thermoplastic materials comprising a hopper and downstream of the latter a chamber of decreasing cross-section, means for feeding to said chamber the material from the hopper, means for supplying heat to the material for gradually melting the material being fed in the chamber, one or more orifices being provided downstream of the chamber for the outlet or discharge of the material.

7 Claims, 1 Drawing Figure

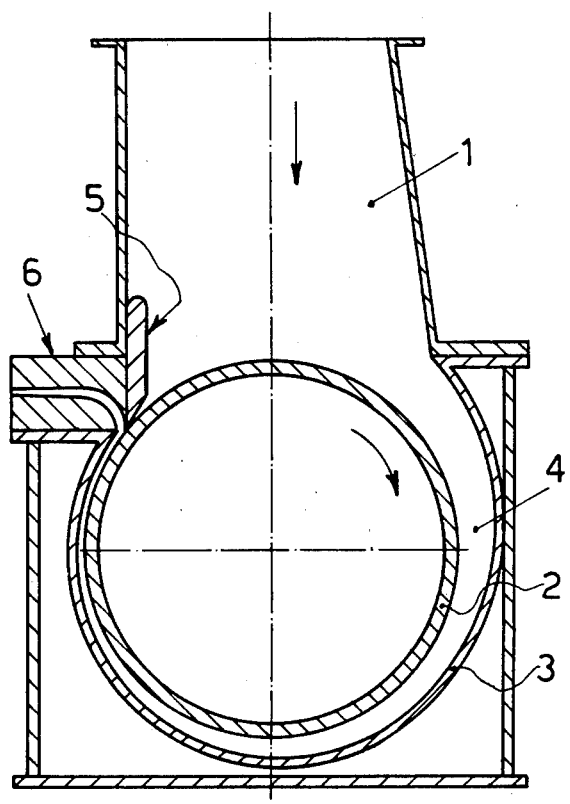

APPARATUS AND PROCESS FOR RECOVERING SCRAPS OF THERMOPLASTIC MATERIAL, EVEN OF HETEROGENEOUS SHAPES, BY GRADUAL MELTING AND COMPRESSION THROUGH ONE OR MORE ORIFICES

This invention relates to an apparatus for gradual melting of thermoplastic materials, even of heterogenous shapes, at the same time and continuously converting such materials in one or more webs of polygonal or circular cross-section (or of any other shape) of semiaggregated or compact material which, after cooling and cutting, can be reused in a nearly granular form for the supply to conventional extruding machines. When applied to a standard extruder, the same apparatus fitted with a particular die is capable of directly producing a manufactured article.

As well known, in all of the industrial processes designed for the production of thermoplastic material manufactured articles, there will be to a higher or lower degree the side production of casual or continuous scraps which may be reintroduced into the productive cycle only when, through suitable devices, a uniform dimension is given thereto, suitable for allowing a continuous gravity supply to the extruding machines, the latter being the starting point for any process of this type.

In the various processes of the above mentioned type, the most common scraps comprise casting sprues of highly varying weight and dimensions, generally very thin and light continues film strips, uniform pieces or laps of flexible sheet from blanking or die cutting operations, tubings of various thickness, baggings or other sub-standards that are discarded from the production lines of the most commonly used flexible packings. The hitherto known systems for recovering these products and reintroducing the same into the productive cycle are the following:

(A) Multiblade mills
(B) Plasticizing or softening devices (A) In multiblade mills the material is broken into shivers which are of more or less uniform shape. When scrap material comprises sprues or elements originally being of a compact form, the granulate provided by passing through the mill is generally reintroduced into the extruding machines without any further treatments. On the other hand, when thin and flexible material is dealt with, such as films or tubings, after cutting in a multiblade mill, not having a density to assure gravity feeding for the extruding machines, has to be recycled by a complicated system of collection and storage, then allowing metering and forced feeding thereof.

After cutting in a mill, it is sometimes preferred to convert this material in granules of a shape and weight quite similar to those of the material formerly used in the extruders, by resorting to a separate extruding process in machines provided with a particular feed producing one or more continuous cylindrical beads transformed by cooling and cutting into granules.

(B) Plasticizing or softening devices consists of a cylindrically shaped sheet or plate container, on the bottom of which two or more blades rotate.

The scrap material of the most different dimensions and shapes is discharged from the top into the container and the rotary blades provide for progressively convert it to increasingly elementary dimensions. The strong dynamic action caused by the blades produces heat and in the material a progressive plasticizing effect due to the increase in temperature.

Prior to complete melting of the material, a predetermined amount of water is introduced into the container which, by stopping the melting process, causes the agglomeration of the particles at the semiplasticized state in sintered granules which are immediately discharged from the bottom into an external hopper. However, said plasticizing or softening device can be generally used only for scraps of thin, flexible and limited size. It is not used for sprues or pieces of a considerable size, since the knives as well as the structure of the container would not withstand to such a not gradual cutting action.

The ordinary defects to be found in the above mentioned systems are as follows:

(1) High noise due to the action of the blades on the material.

(2) Necessity of specializing the cutting system in connection with the material to be crumbled. In the case of sprues, use can be made of only a mill which is particularly rugged and powerful and a plasticizing or softening device cannot be resorted to.

(3) High changes of electrical load or charge due to the uneven quality and quantity of the material supplied to the machine.

Therefore, it is the basic object of the present invention to overcome the above mentioned disadvantages.

A device according to the present invention for recovering thermoplastic materials is essentially characterized by comprising a hopper into which the material is introduced, a chamber downstream of said hopper, the chamber being of decreasing cross-section, means for feeding the material along said chamber and means for supplying heat to the material, so that the latter will gradually melt on being fed in the chamber, which material on forward moving is compressed to the most restricted zone, then being forced to the outside through one or more orifices. The apparatus according to the present invention allows the recovery of heterogenous thermoplastic materials by a gradual feed of the machine provided by thermal plasticizing effect and accordingly without any noise.

In order to more clearly depict the features of the apparatus according to the present invention, an exemplary embodiment of the apparatus according to the invention will be described with reference to the accompanying drawing schematically showing the apparatus in a sectional view taken along a vertical plane.

The apparatus, as shown in the drawing by mere way of unrestrictive example, comprises a material loading hopper denoted at 1, the bottom of which comprises a metal cylinder 2 carried for rotation about its own geometrical axis relative to the stationary frame and hopper. Means are provided, as including a motor and suitable drive members, for driving said cylinder 2. This cylinder 2 is electrically heated, or by suitable fluids. The temperature in cylinder 2 is set to higher values than those corresponding to the melting point of the material to be processed and the cylinder is rotated at a speed which is also adjustable and definable in accordance with the thermoplastic characteristics of the introduced material. Cylinder 2 is accomodated within a cylindrical casing 3 also heated, but eccentrical with respect to the axis of said cylinder 2. The walls of casing 3 substantially comprise the extension of loading hopper 1.

Therefore, between said casing 3 and cylinder 2 a chamber 4 is provided of increasingly reduced cross-section, terminating against a doctor blade 5, followed by a die 6 provided with holes or slits.

The operation of the above described apparatus is substantially as follows:

By bearing on the hot surface of rotary drum or cylinder 2, the material introduced into hopper 1 gradually melts and adhering against the surface thereof is continuously drawn inside chamber 4 between said cylindrical casing 3 and drum or cylinder 2. As the cross-section of chamber 4 decreases, the molten or sempliplastic material, subjected to the viscoelastic strains or stresses imparted by the surface drawing the material, is compressed to the most restricted zone of the chamber and, by ending against doctor blade 5, is then forced to the outside through one or more orifices provided in said end die 6, the latter being also electrically heated to maintain the molten material at fluid state.

According to the orifices provided in the die, the total cross-section of which is obviously proportional to the melting capacity of the machine, one or more webs of material having cylindrical or polygonal shape can be continuously obtained. By successively arranging a cooling and cutting device uniform and ready usable granules can be obtained. On the other hand, by connecting said apparatus, but without a die, to a conventional extruder, a plastic manufactured article can be directly extruded by suitable expedients.

In a single operation, the apparatus according to the present invention enables the reuse of material scraps of any shape and nature, provided that thermoplastic materials are concerned with, in conventional extruding machines with economical advantages and without any noise. The apparatus further allows the recovery and reuse of thermoplastic materials of heterogeneous shape and more gradual use of power or energy relative to the conventional apparatuses.

What I claim is:

1. An apparatus for recovering homogeneous or heterogeneous thermoplastic materials, comprising a hopper into which the material is introduced, a chamber downstream of said hopper, the chamber being of decreasing cross-section, means for feeding the material along said chamber from said hopper, and means for supplying heat to the material, so that the latter gradually melts in its forward movement in the chamber, the material on forward moving being compressed to the most restricted zone and being then forced to the outside through one or more orifices.

2. An apparatus according to claim 1, wherein said chamber comprises the space between the outer surface of a rotary cylinder or drum and the inner surface of a cylindrical casing accomodating said rotary cylinder or drum and which is eccentrical relative to the latter, means being provided for rotating said cylinder at an adjustable speed, means for heating at an adjustable temperature said rotary cylinder or drum, and means for heating still at predetermined temperatures said cylindrical casing, so that the apparatus can gradually and continuously melt any thermoplastic material, compressing the latter by viscoelastic draw between said heated rotary cylinder or drum and said eccentrical as well heated casing.

3. An apparatus according to claim 1, comprising downstream of said decreasing cross-section chamber a die, so that the apparatus enables to provide one or more continuous cylindrical or polygonal webs from thermoplastic materials of heterogeneous shapes by a single operation through said die.

4. An apparatus according to claim 1, for continuously feeding an extruder located downstream of the apparatus for the production of plastic manufactured articles from thermoplastic materials of heterogeneous shape.

5. A process for recovering homogeneous or heterogeneous thermoplastic materials, wherein the material is introduced into a hopper and then the material is passed through a chamber of decreasing cross-section, while the material is heated to gradually melt as it moves forward in said chamber, on forward moving said material being compressed to the most restricted zone and being then forced to the outside through one or more orifices.

6. An apparatus according to claim 2, comprising downstream of said decreasing cross-section chamber a die, so that the apparatus enables to provide one or more continuous cylindrical or polygonal webs from thermoplastic materials of heterogeneous shapes by a single operation through said die.

7. An apparatus according to claim 2, for continuously feeding an extruder located downstream of the apparatus for the production of plastic manufactured articles from thermoplastic materials of heterogeneous shape.

* * * * *